United States Patent
Kobayashi (10) Patent No.: US 8,004,643 B2
(45) Date of Patent: Aug. 23, 2011

(54) LIQUID CRYSTAL DISPLAY DEVICE

(75) Inventor: Kunpei Kobayashi, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 243 days.

(21) Appl. No.: 12/400,267

(22) Filed: Mar. 9, 2009

(65) Prior Publication Data
US 2009/0244464 A1 Oct. 1, 2009

(30) Foreign Application Priority Data

Mar. 26, 2008 (JP) ................ 2008-081256

(51) Int. Cl.
G02F 1/1343 (2006.01)
G02F 1/1335 (2006.01)
(52) U.S. Cl. ........................... 349/141; 349/114
(58) Field of Classification Search .............. None
See application file for complete search history.

(56) References Cited

U.S. PATENT DOCUMENTS

| | | |
|---|---|---|
| 6,950,167 B2 | 9/2005 | Matsumoto et al. |
| 7,177,002 B2 | 2/2007 | Matsumoto et al. |
| 7,492,431 B2 * | 2/2009 | Matsumoto et al. ......... 349/146 |
| 7,675,579 B2 | 3/2010 | Suzuki |
| 2007/0177090 A1 | 8/2007 | Shimomaki |
| 2008/0018840 A1 * | 1/2008 | Uehara et al. ............... 349/114 |
| 2008/0074602 A1 | 3/2008 | Arai et al. |

FOREIGN PATENT DOCUMENTS

| | | |
|---|---|---|
| JP | 2002-82357 A | 3/2002 |
| JP | 2002-182230 A | 6/2002 |
| JP | 2004-109794 A | 4/2004 |
| JP | 2007-003877 A | 1/2007 |
| JP | 2008-83395 A | 4/2008 |
| KR | 2004-107648 A | 12/2004 |
| KR | 2006-135537 A | 12/2006 |

OTHER PUBLICATIONS

Korean Office Action dated Aug. 25, 2010 (and English translation thereof) in counterpart Korean Application No. 10-2009-0023716.
Japanese Office Action dated Mar. 9, 2010 and English translation thereof in counterpart Japanese Application No. 2008-081256.

* cited by examiner

*Primary Examiner* — Tina M Wong
(74) *Attorney, Agent, or Firm* — Holtz, Holtz, Goodman & Chick PC

(57) ABSTRACT

A liquid crystal display device includes first and second substrates which have opposed surfaces respectively provided with aligning films and have undergone aligning treatments such that aligning treatment directions are parallel and opposite between the films, and a liquid crystal layer made of a liquid crystal having a negative dielectric anisotropy and placed between the substrates such that molecular long axes of the liquid crystal are oriented parallel to surfaces of the substrates. The first substrate includes a first conductive layer in which elongated slits obliquely crossing the aligning treatment direction are formed parallel to each other, and a second conductive layer formed on a layer different from the first layer through an insulating layer so as to overlap the slits and overlap at least part of the first layer. Each slit includes first and second linear portions extending in different directions at angles line-symmetrical to the aligning treatment direction.

20 Claims, 7 Drawing Sheets

LIQUID CRYSTAL DISPLAY DEVICE

CROSS-REFERENCE TO RELATED APPLICATIONS

This application is based upon and claims the benefit of priority from prior Japanese Patent Application No. 2008-081256, filed Mar. 26, 2008, the entire contents of which are incorporated herein by reference.

BACKGROUND OF THE INVENTION

1. Field of the Invention

The present invention relates to a lateral electric field control liquid crystal display device.

2. Description of the Related Art

As a liquid crystal display device, there is available a lateral electric field control liquid crystal display device which performs display by changing the molecular long axis direction of liquid crystal molecules within a plane almost parallel to a substrate surface (Jpn. Pat. Appln. KOKAI Publication Nos. 2002-082357 and 2002-182230).

In a conventional lateral electric field control liquid crystal display device, disclination occurs at a portion corresponding to an edge of an electrode for generating a lateral electric field. In addition, when an observation surface is pressed with a finger or the like (this operation will be referred to as surface pressing hereinafter), disclination occurs at the pressed portion.

Disclination occurring at a portion corresponding to the edge of the electrode is display irregularity which occurs when the liquid crystal molecules in a portion corresponding to the edge of the electrode behave so as to rise upright relative to a substrate surface upon application of a strong electric field.

The above disclination due to surface pressing is display irregularity which occurs when an observation surface is partly pressed while the above lateral electric field is applied, the alignment of liquid crystal molecules is disturbed by the surface pressing force, and the disturbed alignment state of the liquid crystal molecules is maintained and is not restored to the initial alignment state even after the surface pressing force is released.

BRIEF SUMMARY OF THE INVENTION

It is an object of the present invention to provide a lateral electric field control liquid crystal display device which can suppress the occurrence of display irregularity.

According to a preferred embodiment of the present invention, there is provided a liquid crystal display device including a first substrate and a second substrate which have opposed surfaces respectively provided with aligning films and have undergone aligning treatments such that aligning treatment directions are parallel and opposite between the aligning films, and a liquid crystal layer which comprises a liquid crystal having a negative dielectric anisotropy and is placed between the first substrate and the second substrate such that molecular long axes of the liquid crystal are oriented substantially parallel to surfaces of the substrates. The first substrate includes a first conductive layer on which elongated electrode portions obliquely crossing the aligning treatment direction are formed parallel to each other so as to form slit portions between the adjacent electrode portions, and a second conductive layer which is formed on a layer different from the first conductive layer through an insulating layer so as to overlap the slit portions and overlap at least part of the first conductive layer. The elongated electrode portions each include a first linear portion and a second linear portion which extend in different directions at angles line-symmetrical with respect to the aligning treatment direction.

According to a preferred embodiment of the present invention, there is provided a liquid crystal display device including a first substrate and a second substrate which have opposed surfaces respectively provided with aligning films and have undergone aligning treatments such that aligning treatment directions are parallel and opposite between the aligning films, and a liquid crystal layer which comprises a liquid crystal having a negative dielectric anisotropy and is placed between the first substrate and the second substrate such that molecular long axes of the liquid crystal are oriented substantially parallel to surfaces of the substrates. The first substrate includes a first conductive layer in which elongated slit portions obliquely crossing the aligning treatment direction are formed parallel to each other, and a second conductive layer which is formed on a layer different from the first conductive layer through an insulating layer so as to overlap the slit portions and overlap at least part of the first conductive layer. The elongated slit portions each includes a first linear portion and a second linear portion which extend in different directions at angles line symmetrical with respect to the aligning treatment direction.

According to the liquid crystal display device of the present invention, the occurrence of display irregularity can be suppressed.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The best mode for carrying out the present invention will be described below with reference to the views of the accompanying drawing.

First Embodiment

Figure 1:
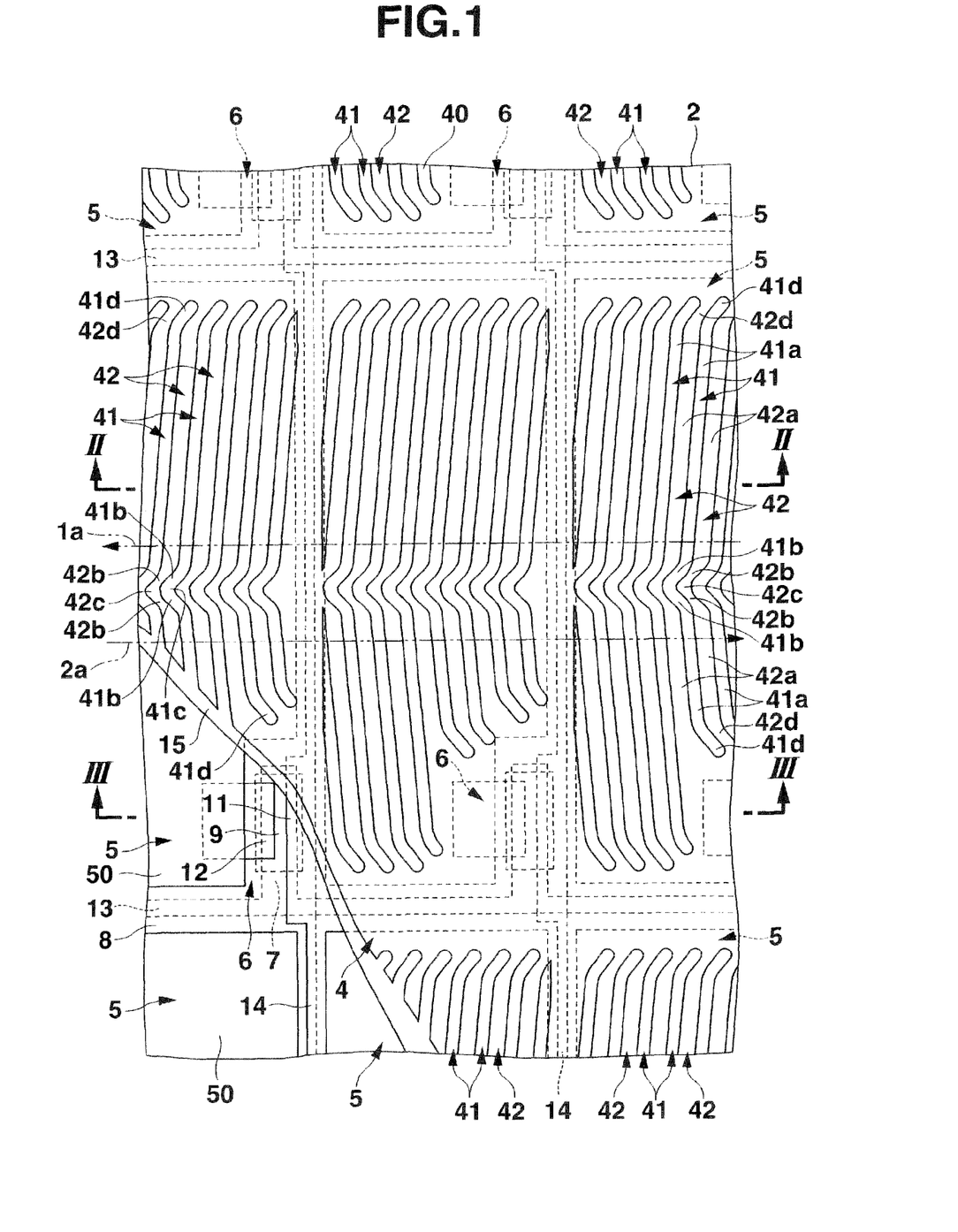
FIG. 1 is a plan view of part of one substrate of a liquid crystal display device according to the first embodiment.
Figure 2:
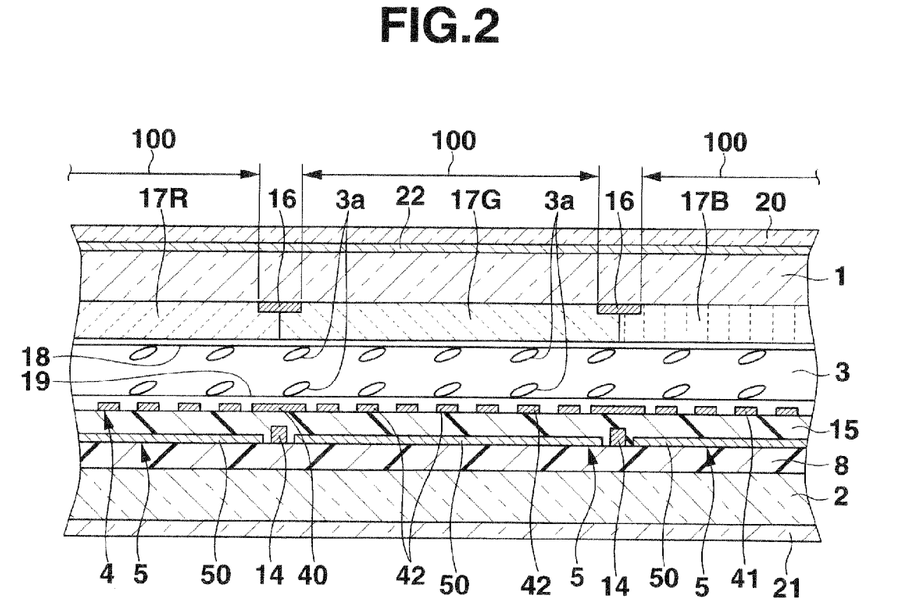
FIG. 2 is a sectional view taken along a line II-II of the liquid crystal display device in FIG. 1.
Figure 3:
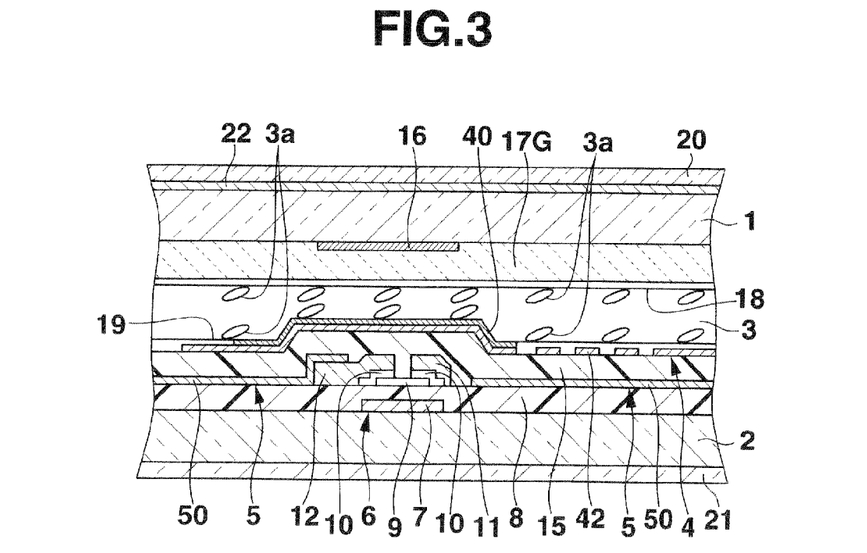
FIG. 3 is a sectional view taken along a line III-III of the liquid crystal display device in FIG. 1.

FIGS. 1 to 7 show the first embodiment of the present invention. FIG. 1 is a plan view of part of one substrate of a liquid crystal display device. FIG. 2 is a sectional view taken along a line II-II of the liquid crystal display device in FIG. 1. FIG. 3 is a sectional view taken along a line III-III of the liquid crystal display device in FIG. 1.

As shown in FIGS. 1 to 3, this liquid crystal display device includes a pair of transparent substrates 1 and 2, a liquid crystal layer 3, a first transparent electrode 4, and second electrodes 5. The substrates 1 and 2 are arranged to face each other through a predetermined gap. Aligning films 18 and 19 are provided on the inner surfaces of the respective substrates which face each other. The substrate on the observation side (the upper side in FIGS. 2 and 3) and the substrate on the opposite side respectively have undergone aligning treatments in parallel and opposite directions 1a and 2a. The liquid crystal layer 3 is sealed in the gap between the pair of substrates 1 and 2, and the molecular long axes of liquid crystal molecules 3a are oriented almost parallel to the surfaces of the substrates 1 and 2 so as to be aligned with the aligning treatment directions 1a and 2a of the pair of substrates 1 and 2. The first transparent electrode 4 is provided on one of the inner surfaces of the pair of substrates 1 and 2 which face each other, e.g., the inner surface of the substrate 2 on the opposite side (to be referred to as a rear substrate hereinafter) to the observation side, at a position closer to the substrate 2 than the aligning film 19. The second electrodes 5 are provided on the inner surface of the rear substrate 2 at a position closer to the rear substrate 2 than the aligning film 19 so as to be insulated from the first electrode 4. The second electrode 5 is to generate a lateral electric field between itself and the first electrode 4 to change the molecular long axis direction of the liquid crystal molecules 3a within a plane almost parallel to the surfaces of the pair of substrates 1 and 2.

This liquid crystal display device is an active matrix liquid crystal display device. Of the first and second electrodes 4 and 5 provided on the inner surface of the rear substrate 2 so as to be insulated from each other, the second electrodes 5 are pixel electrodes arranged in a matrix form in the row direction (the horizontal direction of the screen) and the column direction (the vertical direction of the screen), and the first electrode 4 is a common electrode corresponding to the pixel electrodes 5.

The inner surface of the rear substrate 2 is provided with thin-film transistors (to be referred to as TFTs hereinafter) 6 which are arranged in the row and column directions and to which display signals corresponding to display data are supplied, and interconnections which are provided between the rows and columns of the TFTs 6 arranged in the above manner and include scanning lines 13 which supply scanning signals to the TFTs 6 of the respective rows and signal lines 14 which supply display signals to the TFTs 6 of the respective columns.

The TFT 6 includes a gate electrode 7 formed on the substrate surface of the rear substrate 2, a transparent gate insulating film 8 formed on almost the entire surface of the rear substrate 2 so as to cover the gate electrode 7, an i-type semiconductor film 9 formed on the gate insulating film 8 so as to face the gate electrode 7, and drain and source electrodes 11 and 12 formed on two side portions of the i-type semiconductor film 9 through n-type semiconductor films 10.

The scanning lines 13 are formed on the substrate surface of the rear substrate 2 so as to extend along one side (the lower side in FIG. 1) of each pixel 100 of each row, and are respectively connected to the gate electrodes 7 of the TFTs 6 of each row. The signal lines 14 are formed on the gate insulating film 8 so as to extend along one side (the left side in FIG. 1) of each pixel 100 of each column, and are respectively connected to the drain electrodes 11 of the TFTs 6 of each column.

The pixel electrodes 5 are formed on the gate insulating film 8 so as to be respectively connected to the source electrodes 12 of the TFTs 6 for each predetermined region for the formation of one pixel 100. That is, the pixel electrodes 5 are isolated for each pixel region and respectively connected to the different TFTs 6.

The common electrode 4 is formed on a transparent insulating film 15 formed on almost the entire surface of the rear substrate 2 so as to cover the TFTs 6 and the signal lines 14. That is, the common electrode 4 is placed between the pixel electrodes 5 and the aligning film 19 formed on the inner surface of the rear substrate 2 so as to be insulated from the pixel electrodes 5 by the insulating film 15 and cover the scanning lines 13 and the signal lines 14. The common electrode 4 is electrically connected among the respective pixel regions to be set at the same potential among the pixel regions.

Note that a terminal array portion (not shown) is formed on an edge portion of the rear substrate 2 so as to protrude outside the substrate 1 on the observation side. The scanning lines 13 and the signal lines 14 are connected to scanning line terminals and signal line terminals provided on the terminal array portion. The common electrode 41s connected to a common electrode terminal provided on the terminal array portion.

Light-shielding films 16 are formed on the inner surface of the substrate 1 on the observation side so as to correspond to regions among the pixels 100 and the disposition regions of the TFTs 6. Color filters 17R, 17G, and 17B of three colors, i.e., red, green, and blue, are provided on the light-shielding films 16 so as to correspond to the respective pixels 100.

The aligning films 18 and 19 are homogeneous alignment films made of polyimide films or the like, and are respectively formed on the inner surfaces of the pair of substrates 1 and 2 so as to cover the color filters 17R, 17G, and 17B and the common electrode 4.

The inner surfaces of the pair of substrates 1 and 2 are subjected to aligning treatments by rubbing the film surfaces of the aligning films 18 and 19 in parallel and opposite directions. In this embodiment, an aligning treatment is performed on the inner surface of the observation-side substrate 1 from the right to the left on the screen in a direction parallel to the horizontal direction of the screen, and an aligning treatment is performed on the inner surface of the rear substrate 2 from the left to the right on the screen in a direction parallel to the horizontal direction of the screen.

The pair of substrates 1 and 2 are joined to each other through a frame-like seal member (not shown). The liquid crystal layer 3 is sealed in the region surrounded by the seal member in the gap between the pair of substrates 1 and 2.

In addition, polarizing plates 20 and 21 are respectively arranged on the outer surfaces of the pair of substrates 1 and 2. A transparent static electricity blocking conductive film 22 for blocking external static electricity is placed between the observation-side substrate 1 and the observation-side polarizing plate 20 placed on the outer surface of the observation-side substrate 1.

The common electrode 4 and pixel electrodes 5 which are formed on the inner surface of the rear substrate 2 will be described in detail below. The pixel electrodes 5 each comprise a transparent conductive film 50 such as an ITO film formed into a shape corresponding to a predetermined region for the formation of one pixel 100 described above, e.g., a rectangular region which is longer than wide, that is, the vertical width along the vertical direction of the screen is larger than the horizontal width along the horizontal direction of the screen.

The common electrode 4 is formed on the entire region in which the pixel electrodes 5 are arranged in a matrix form so as to cover the scanning lines 13 and the signal lines 14. The common electrode 4 is provided with slits 41 which are formed at intervals, for each predetermined region for the formation of one pixel 100, to form edges crossing the aligning treatment directions 1a and 2a of the pair of substrates 1 and 2 in an oblique direction other than directions perpendicular and parallel to the aligning treatment directions 1a and 2a.

The slits 41 of the common electrode 4 each are formed into an almost doglegged shape having a length almost equal to or slightly smaller than the length of the pixel electrode 5 in a direction perpendicular to the aligning treatment directions 1a and 2a and having two linear portions 41a respectively extending from a middle portion in the lengthwise direction to one end and the other end in directions tilting toward one side relative to directions perpendicular to the aligning treatment directions 1a and 2a of the pair of the substrates 1 and 2, i.e., directions crossing the aligning treatment directions 1a and 2a at a predetermined angle.

The crossing angle of one and the other linear portions 41a of each of the slits 41 of the common electrode 4 with respect to the respective aligning treatment directions is set to an angle smaller than 90° and lager than 70°.

The common electrode 4 comprises a transparent conductive film 40 made of an ITO film or the like in which the slits 41 are formed parallel at intervals so as to obliquely cross the aligning treatment directions 1a and 2a. Each of the slits 41 is formed into a continuous shape constituted by one and the other linear portions 41a which extend from the middle portion in the lengthwise direction of the slit toward one end and the other end in directions tilting to one side (the right side in FIG. 1) relative to directions perpendicular to the aligning treatment directions 1a and 2a and crossing the aligning treatment directions 1a and 2a at a predetermined angle, bent portions 41b which are respectively formed at the adjacent ends of one and the other linear portions 41a and extend in directions crossing the aligning treatment directions 1a and 2a at an angle smaller than the crossing angle of the linear portions 41a with respect to the aligning treatment directions 1a and 2a, and a joint portion 41c between the bent portions 41b.

In addition, the slits 41 of the common electrode 4 each have bent end portions 41d which are respectively formed at the ends, of one and the other linear portions 41a, which are located on the opposite side to their adjacent ends and extend in directions crossing the aligning treatment directions 1a and 2a at an angle smaller than the crossing angle of the linear portions 41a with respect to the aligning treatment directions 1a and 2a.

The connecting portions between the linear portions 41a and the bent portions 41b of each of the slits 41 each are formed into an arcuated shape such that the two side edges of the linear portion 41a and the bent portion 41b are smoothly continuous. The joint portion 41c between the two bent portions 41b is formed into an arcuated shape such that the two side edges of the joint portion 41c and the bent portion 41b are smoothly continuous. Furthermore, the connecting portions between the linear portions 41a and the bent end portions 41d each are formed into an arcuated shape such that the two side edges of the linear portion 41a and the bent end portion 41d are smoothly continuous.

The common electrode 4 is an electrode having elongated electrode portions 42, each including a portion between the adjacent slits 41 and portions located outside the slits 41 on the two sides, formed side by side at intervals corresponding to the width of the slit 41 for each predetermined region for the formation of one pixel 100 described above. The elongated electrode portions 42 conform to the shape of the slit 41.

Each of the elongated electrode portions 42 of the common electrode 4 is formed into a smoothly continuous shape constituted by one and the other linear portions 42a which extend from the middle portion in the lengthwise direction of the slit toward one end and the other end in directions tilting to one side relative to directions perpendicular to the aligning treatment directions 1a and 2a and crossing the aligning treatment directions 1a and 2a at a predetermined angle, bent portions 42b which are respectively formed at the adjacent ends of one and the other linear portions 42a and extend in directions crossing the aligning treatment directions 1a and 2a at an angle smaller than the crossing angle of the linear portions 42a with respect to the aligning treatment directions 1a and 2a, a joint portion 42c between the bent portions 42b, and bent end portions 42d which are respectively formed at ends, of one and the other linear portions 42a, which are located on the opposite side to their adjacent ends and extend in directions crossing the aligning treatment directions 1a and 2a at an angle smaller than the crossing angle of the linear portions 42a with respect to the aligning treatment directions 1a and 2a.

One and the other linear portions 41a of each of the slits 41 of the common electrode 4 have almost the same width, and one and the other linear portions 42a of the elongated electrode portions 42, which include portions between the adjacent slits 41 and portions located outside the slits 41 on the two sides, have almost the same width. In addition, a ratio D/W between a width D of the linear portion 41a of the slit 41 and a width W (see FIG. 5) of the elongated electrode portion 42 is set to 1/3 to 3/1, preferably 1/1.

Figure 4:
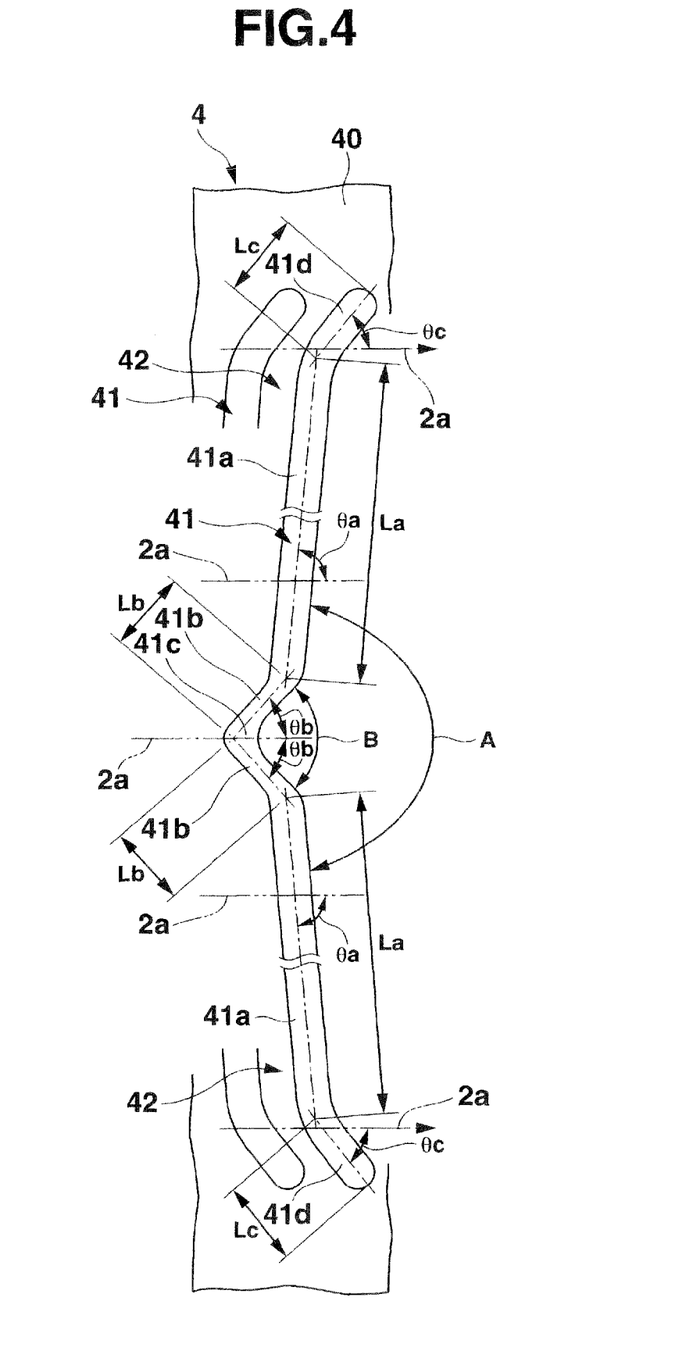
FIG. 4 is an enlarged plan view of one slit portion of a common electrode in the liquid crystal display device.

FIG. 4 is an enlarged plan view of part of one slit 41 of the common electrode 4. Letting $\theta a$ be the crossing angle of one and the other linear portions 41a of each of the slits 41 with respect to the aligning treatment directions 1a and 2a, the crossing angle is set to $$70° < \theta a < 90°.$$

The crossing angle of one and the other linear portions 42a of each of the elongated electrode portion 42 with respect to the aligning treatment directions 1a and 2a is almost the same as the above value.

Letting $\theta b$ be the crossing angle of the bent portions 41b provided at the adjacent ends of one and the other linear portions 41a of each of the slits 41 with respect to the aligning treatment directions 1a and 2a, the crossing angle is set to $$50° < \theta b < 70°.$$

The crossing angle of the bent portions 42b of each of the elongated electrode portions 42 with respect to the aligning treatment directions 1a and 2a is almost the same as the above value.

Letting La be the length of one and the other linear portions 41a of each of the slits 41, and Lb be the length of the bent portions 41b provided at the adjacent ends of one and the other linear portions 41a, the length La of the linear portions 41a and the length Lb of the bent portions 41b are set to $$La > nLb \ (n: 3\text{-}5) \text{ or}$$

$$10Lb > La > 4Lb.$$

The length relationship between one and the other linear portions 42a of the elongated electrode portions 42 and the bent portions 42b of the elongated electrode portions 42 is almost the same as that described above.

Letting θc be the crossing angle of the bent end portions 41d of the slits 41 with respect to the aligning treatment directions 1a and 2a, the crossing angle is set to $$50° < θc < 70°.$$

The crossing angle of the bent end portions 42d of the elongated electrode portions 42 with respect to the aligning treatment directions 1a and 2a is almost the same as the above value.

Letting Lc be the length of the bent end portions 41d at the two ends of each of the slits 41, the relationship between the length La of one and the other linear portions 41a and the length Lb of the bent portions 41b is set to satisfy $$La > nLc \ (n: 3\text{-}5) \text{ or}$$

$$10Lc > La > 4Lc.$$

The length relationship between one and the other linear portions 42a of each of the elongated electrode portions 42 and the bent end portions 42d of each of the elongated electrode portions 42 is almost the same as that described above.

That is, the bent end portions 41d of the slits 41 are formed to have almost the same tilt angle and length as those of the bent portions 41b which joint one and the other linear portions 41a.

The crossing angle θa of one and the other linear portions 41a of each of the slits 41 with respect to the aligning treatment directions 1a and 2a is preferably set to 80°±5°, more desirably 80°±2°. The crossing angles θb and θc of the bent portion 41b and bent end portion 41d with respect to the aligning treatment directions 1a and 2a are preferably set to 60°±5°, more desirably 60°±2°.

Note that the linear portion 41a, of one and the other linear portions 41a of each of the slits 41, which extends toward the location of the TFTs 6 is formed to have a length that does not overlap the disposition portion of the TFTs 6.

The liquid crystal layer 3 comprises a nematic liquid crystal having a negative dielectric anisotropy. The liquid crystal molecules 3a of the liquid crystal layer 3 are oriented almost parallel to the surfaces of the substrates 1 and 2 while the molecular long axes are aligned with the aligning treatment directions 1a and 2a and are uniformly pre-tilted, relative to one of the substrate surfaces, e.g., the surface of the rear substrate 2, in a direction away from the rear substrate 2 toward the aligning treatment direction 2a of the inner surface of the rear substrate 2.

This liquid crystal display device generates a lateral electric field, which changes the molecular long axis direction of the liquid crystal molecules 3a to a direction almost parallel to the surfaces of the substrates 1 and 2, between the edges of the slits 41 of the common electrode 4, i.e., the edge portions of the elongated electrode portions 42, and the pixel electrodes 5 by applying a driving voltage corresponding to a display signal between the common electrode 4 of the pixels 100 and the pixel electrodes 5. This lateral electric field controls the molecular long axis direction of the liquid crystal molecules 3a of the pixels 100 within a plane almost parallel to the surfaces of the substrates 1 and 2, thereby displaying an image.

Figure 5:
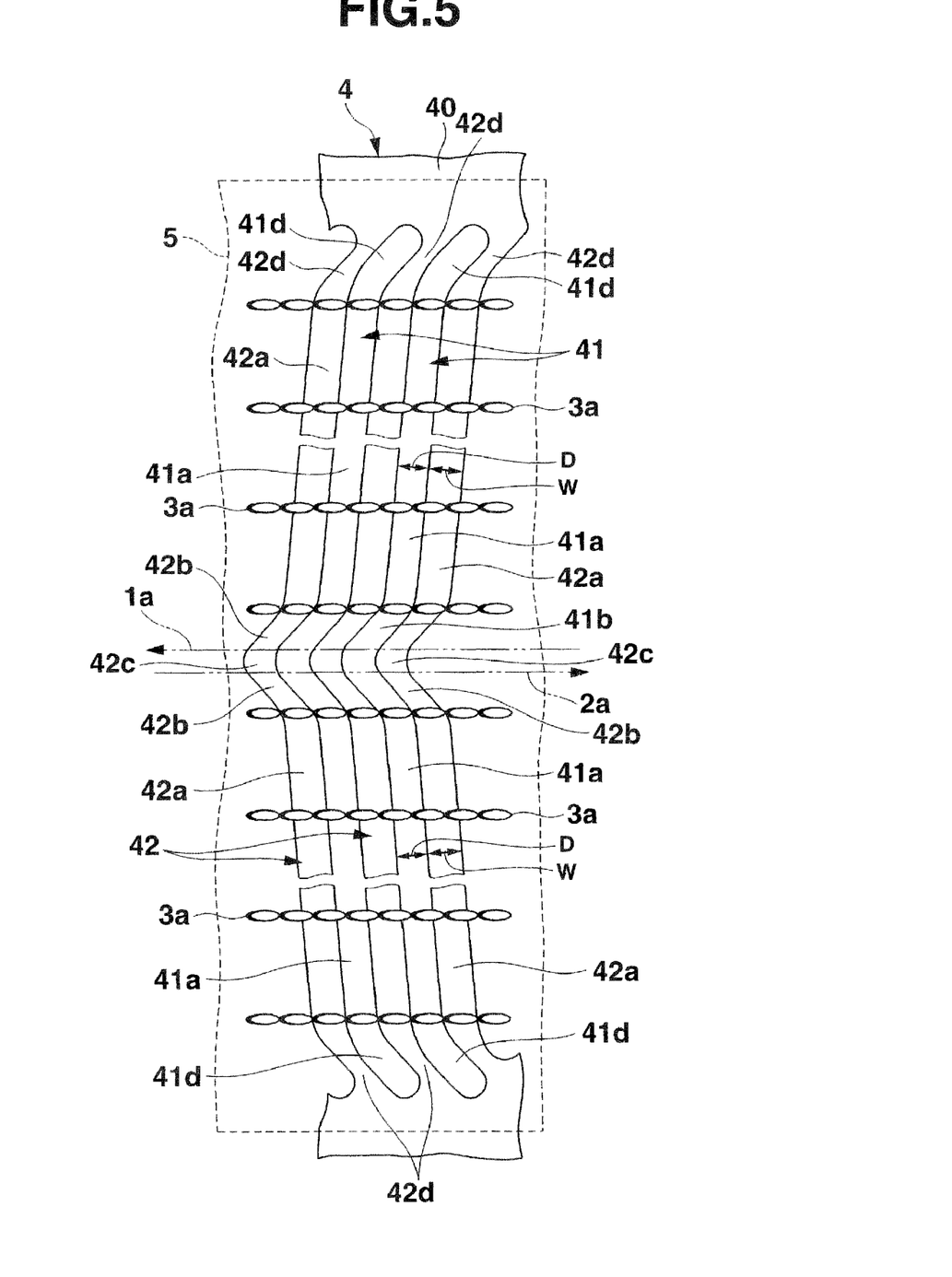
FIG. 5 is a plan view showing the molecular long axis direction of liquid crystal molecules in each portion in one pixel when no lateral electric field is generated in the liquid crystal display device.
Figure 6:
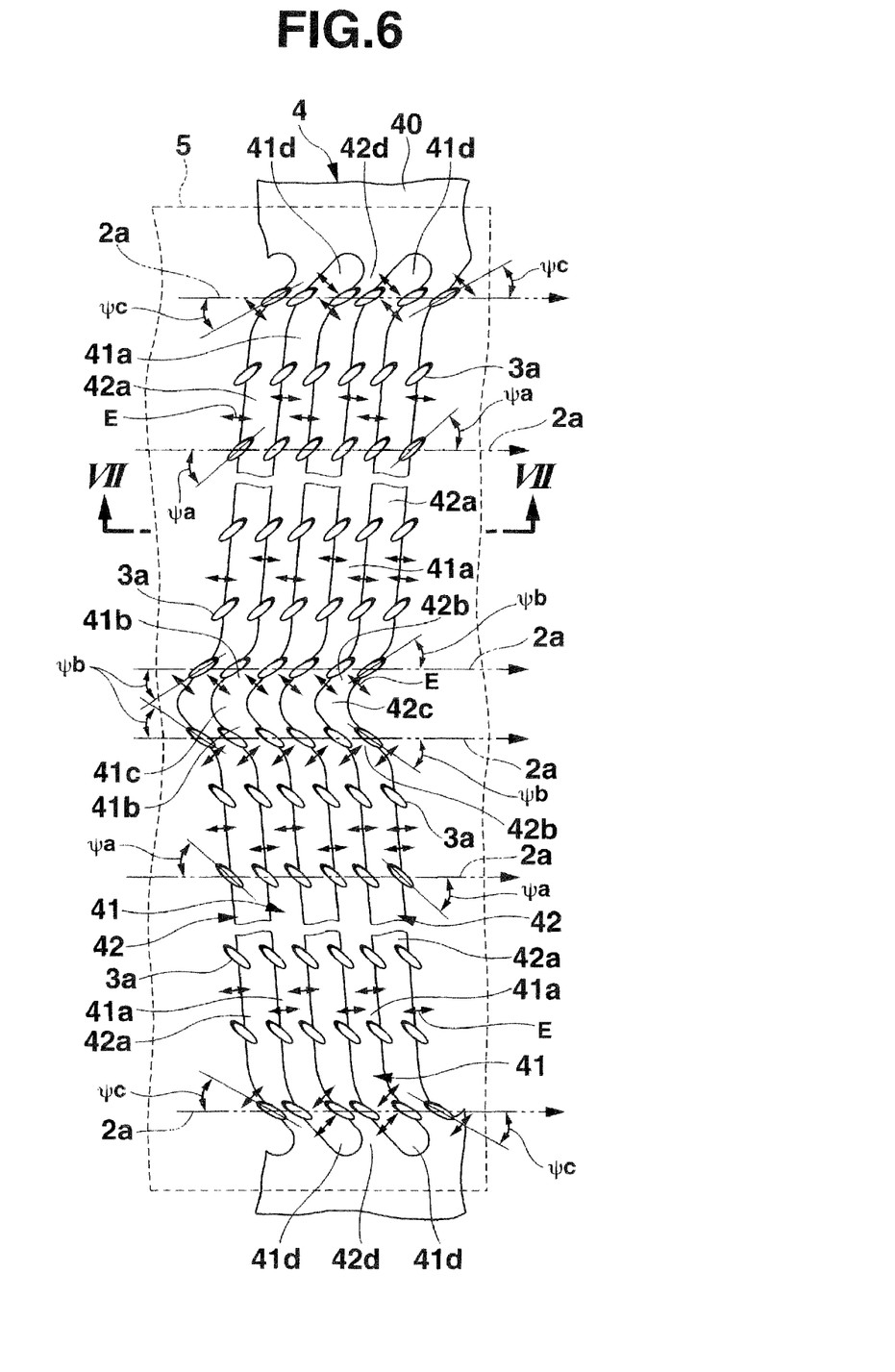
FIG. 6 is a plan view showing the molecular long axis direction of liquid crystal molecules in each portion in one pixel when a lateral electric field is generated in the liquid crystal display device.

FIG. 5 is a plan view showing the molecular long axis direction of the liquid crystal molecules 3a in each portion in one pixel 100 when the above lateral electric field is not generated. FIG. 6 is a plan view showing the molecular long axis direction of the liquid crystal molecules 3a in each portion in one pixel 100 when the above lateral electric field is generated.

Figure 7:
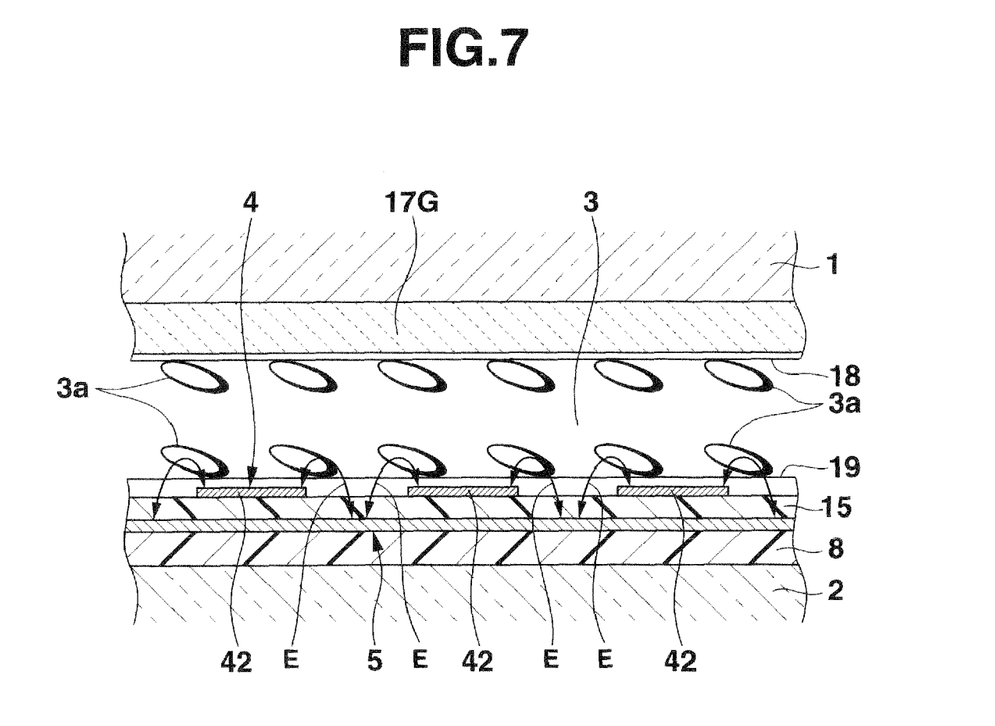
FIG. 7 is an enlarged sectional view taken along a line VII-VII in FIG. 6.

FIG. 7 is an enlarged sectional view taken along a line VII-VII in FIG. 6.

The driving voltage to be applied between the common electrode 4 and the pixel electrode 5 is controlled in accordance with the above display signal within the range from a minimum value of almost 0 V which does not generate the above lateral electric field to a maximum value which generates the lateral electric field having a strength that orients the molecular long axes of the liquid crystal molecules 3a in regions along the edges of one and the other linear portions 41a of each of the slits 41 of the elongated electrode portions 42 of the common electrode 4 (the edge portions to one and the other linear portions 42a of each of the elongated electrode portions 42) in directions at an angle of almost 45° with respect to the aligning treatment directions 1a and 2a.

Note that the liquid crystal display device of this embodiment is of a normally dark display type (to be referred to as a normally black type hereinafter) in which the transmission axis of one of the observation-side polarizing plate 20 and the rear-side polarizing plate 21 is set to be almost parallel or perpendicular to the aligning treatment directions 1a and 2a, while the transmission axis of the other polarizing plate is set to be almost perpendicular to the transmission axis of one polarizing plate. In the non-electric field mode in which the lateral electric field is not generated between the common electrode 4 and the pixel electrode 5, i.e., when the molecular long axes of the liquid crystal molecules 3a are oriented along the aligning treatment directions 1a and 2a as shown in FIG. 5a, the pixel 100 provides black display. When a lateral electric field E having a strength that orients the molecular long axes of the liquid crystal molecules 3a in regions along the edges of one and the other linear portions 41a of each of the slits 41 of the elongated electrode portions 42 of the common electrode 4 in directions at an angle of almost 45° with respect to the aligning treatment directions 1a and 2a as shown in FIGS. 6 and 7 is generated between the common electrode 4 and the pixel electrode 5, the pixel 100 provides brightest display.

As shown in FIGS. 6 and 7, the lateral electric field E is generated between one side edge and the other side edge of each of the slits 41 of the common electrode 4 and portions, of the pixel electrode 5, which are adjacent to one side edge and the other side edge of each of the slits 41 of the common electrode 4.

The lateral electric field E is an electric field in a direction perpendicular to an edge of each of the slits 41 of the common electrode 4. When the lateral electric field E is generated, the direction of the molecular long axes of the liquid crystal molecules 3a is changed to a direction perpendicular to the direction of the lateral electric field in accordance with the strength of the lateral electric field E.

In this liquid crystal display device, the slits 41 of the common electrode 4 each are formed into the shape having one and the other linear portions 41a extending from the middle portion in the lengthwise direction of the slit toward one end and the other end in directions tilting to one side relative to directions perpendicular to the aligning treatment directions 1a and 2a and crossing the aligning treatment directions 1a and 2a at a predetermined angle, with one and the other linear portions 41a crossing the aligning treatment directions 1a and 2a at almost the same angle θa. With this shape, as shown in FIG. 6, the direction of the lateral electric field E generated between the edge of one linear portion 41a of each of the slits 41 of the common electrode 4 and the pixel electrode 5 is made to differ from the direction of the lateral electric field E generated between the edge of the other linear portion 41a of the slit 41 and the pixel electrode 5 to orient the liquid crystal molecules 3a in the two different directions in each pixel 100, thereby performing display with a wide viewing angle with low viewing angle dependence on contrast, brightness, display color, and the like.

In addition, in this liquid crystal display device, the slits 41 of the common electrode 4 each are formed into the continuous shape constituted by one and the other linear portions 41a, the bent portions 41b which are formed at the adjacent ends of one and the other linear portions 41a and extend in the directions crossing the aligning treatment directions 1a and 2a at the angle θb smaller than the crossing angle θa of the linear portions 41a with respect to the aligning treatment directions 1a and 2a, and the joint portion 41c between the bent portions 41b. With this shape, even if the strong lateral electric field E that orients the molecular long axes of the liquid crystal molecules 3a in regions along the edges of one and the other linear portions 41a of each of the slits 41 of the common electrode 4 in directions at an angle of almost 45° or an angle close to it relative to the aligning treatment directions 1a and 2a is generated between the common electrode 4 and the pixel electrode 5, the liquid crystal molecules 3a do not tilt at an angle opposite to the pre-tilt angle set by the above aligning treatment.

That is, in the liquid crystal display device of the above embodiment, the slits 41 of the common electrode 4 each are formed into the shape having the bent portions 41b which are provided at the adjacent ends of one and the other linear portions 41a and extend in directions crossing the aligning treatment directions 1a and 2a at the angle θb smaller than the crossing angle θa of the linear portions 41a with respect to the aligning treatment directions 1a and 2a, with the bent portions 41b being made continuous through the joint portion 41c. With this shape, of the lateral electric fields E generated between the common electrode 4 and the pixel electrode 5, the lateral electric field generated between one side edge and the other side edge of the bent portions 41b of each of the slits 41 of the common electrode 4 and the pixel electrode 5 is the lateral electric field (the electric field in a direction perpendicular to the edges of the bent portions 41b) E in a direction at a crossing angle with respect to the aligning treatment directions 1a and 2a which is larger than that of the lateral electric field E generated between the pixel electrode 5 and one side edge and the other side edge of one and the other linear portions 41a of the slit 41, as shown in FIG. 6.

For this reason, a change angle ψb of the molecular long axis direction of the liquid crystal molecules 3a in regions along one side edge and the other side edge of the bent portions 41b of each of the slits 41 of the common electrode 4 relative to the aligning treatment directions 1a and 2a at the time of generation of the lateral electric field E is smaller than a change angle ψa of the molecular long axis direction of the liquid crystal molecules 3a in regions along one side edge and the other side edge of the one and the other linear portions 41a of the slit 41 relative to the aligning treatment directions 1a and 2a. In addition, the above liquid crystal molecules 3a are strongly influenced by the anchoring force from the aligning film, and the alignment discontinuity of the liquid crystal molecules 3a at the joint portion 41c decreases. As a consequence, the intermolecular force between the adjacent liquid crystal molecules 3a strongly acts on the liquid crystal molecules 3a in regions along one side edge and the other side edge of the bent portions 41b to suppress a change in the tilt angle of the liquid crystal molecules 3a relative to the lateral, electric field E. When a strong electric field is applied between the common electrode 4 and the pixel electrode 5, since the long axes of the liquid crystal molecules 3a in regions along one side edge and the other side edge of the slit 41 are oriented in a direction along one side edge and the other side edge of the slit 41, an electric field component is generated in a direction perpendicular to the substrate at one side edge and the other side edge of the slit 41 by the electric field applied between the common electrode 4 and the pixel electrode 5. However, since this electric field is an electric field in a direction perpendicular to the long axes of the liquid crystal molecules 3a, no force acts to increase the tilt angle of the liquid crystal molecules 3a with respect to the substrate, but a force acts to orient the liquid crystal molecules 3a parallel to the substrate surface.

For this reason, even when the strong lateral electric field E that orients the molecular long axes of the liquid crystal molecules 3a in regions along one and the other linear portions 41a of each of the slits 41 of the common electrode 4 in a direction at an angle of almost 45° or an angle close to it relative to the aligning treatment directions 1a and 2a is generated between the common electrode 4 and the pixel electrode 5, the tilt of the liquid crystal molecules 3a near the bent portions 41b of the slit 41 does not change and remains stable. This maintains the state in which the liquid crystal molecules 3a along one side edge and the other side edge of the bent portions 41b are tilted at the pre-tilt angle set by the aligning treatment.

The liquid crystal display device of this embodiment is therefore free from alignment irregularity such as the inversion of the tilt angle of the liquid crystal molecules 3a in regions along one side edge and the other side edge of one and the other linear portions 41a of the slit 41 relative to a portion corresponding to the inflection point of the slit 41 as a starting point as in a case in which the slits 41 of the common electrode 4 each are shaped into a simple doglegged shape with one and the other linear portions 41a being directly joined to each other.

The connecting portions between one and the other linear portions 41a of each of the slits 41 of the common electrode 4 and the bent portions 41b each are formed into an arcuated shape with the two side edges of the linear portion 41a and the bent portion 41b being smoothly continuous. For this reason, the molecular long axis direction of the liquid crystal molecules 3a in regions along one side edge and the other side edge of one and the other linear portions 41a changes at the pre-tilt angle set by the aligning treatment, following the tilt direction of the liquid crystal molecules 3a in regions along one side edge and the other side edge of the bent portions 41b.

As described above, in the liquid crystal display device of this embodiment, even when the strong lateral electric field E that orients the molecular long axes of the liquid crystal molecules 3a in regions along edges of one and the other linear portions 41a of each of the slits 41 of the common electrode 4 in a direction at an angle of almost 45° or an angle close to it relative to the aligning treatment directions 1a and 2a is generated between the common electrode 4 and the pixel electrode 5, the tilt directions of the liquid crystal molecules 3a in regions along one side edge and the other side edge of each of the slits 41 of the common electrode 4 are made the same throughout the total length of each slit 41, as shown in FIGS. 6 and 7. This can obtain good display quality without display irregularity.

In addition, in this liquid crystal display device, the bent end portions 41d are respectively formed at the ends, of one and the other linear portions 41a of each of the slits 41 of the common electrode 4, which are located on the opposite side to their adjacent ends, so as to extend in directions crossing the aligning treatment directions 1a and 2a at the angle θc smaller than the crossing angle θa of the linear portions 41a with respect to the aligning treatment directions 1a and 2a. This also generates, between the pixel electrode 5 and one side edge and the other side edge of the bent end portions 41d, the lateral electric field E in a direction at a larger crossing angle with respect to the aligning treatment directions 1a and 2a than the lateral electric field E generated between one side edge and the other side of one and the other linear portions 41a of the slit 41 and the pixel electrode 5.

For this reason, a change angle ψc of the molecular long axis direction of the liquid crystal molecules 3a in regions along one side edge and the other side edge of the bent end portions 41d relative to the aligning treatment directions 1a and 2a due to the lateral electric field E is made smaller than the change angle ψa of the molecular long axis direction of the liquid crystal molecules 3a in regions along one side edge and the other side edge of the linear portions 41a relative to the aligning treatment directions 1a and 2a. This can change the molecular long axis direction of the liquid crystal molecules 3a in both the regions along one side edge and the other side edge of the bent end portions 41d in accordance with the pre-tilt angle set by the above aligning treatment.

In this liquid crystal display device, the tilt angle θa of one and the other linear portions 41a of each of the slits 41 of the common electrode 4 with respect to the aligning treatment directions 1a and 2a and the tilt angle θb of the two bent portions 4 b with respect to the aligning treatment directions 1a and 2a are set to 70°<θa<90°

50°<θb<70°.

This can further stabilize the alignment irregularity of the liquid crystal molecules 3a due to the lateral electric field E.

In addition, in this liquid crystal display device, the length La of one and the other linear portions 41a of each of the slits 41 of the common electrode 4 and the length Lb of the two bent portions 41b are set to La>nLb (n: 3-5) or 10Lb>La>4Lb.

This can further improve the stability of the alignment of the liquid crystal molecules 3a by the bent portions 41b of the slits 41 and almost eliminate the influences of the regions corresponding to the bent portions 41b on display.

In addition, in this liquid crystal display device, the tilt angle θc of the bent end portions 41d formed at the ends, of one and the other linear portions 41a of each of the slits 41 of the common electrode 4, which are located on the opposite side to the adjacent ends of the linear portions 41a with respect to the aligning treatment directions 1a and 2a is set to 50°<θc<70°.

This can further improve the stability of the alignment of the liquid crystal molecules 3a when the lateral electric field E is applied.

Furthermore, the length Lc of the bent end portions 41d of the sit 41 relative to the length La of the linear portions 41a of the slit 41 is set to a value satisfying:

La>nLc (n: 3-5) or

10Lc>La>4Lc.

This can further improve the stability of the alignment of the liquid crystal molecules 3a by the bent end portions 41d and almost eliminate the influences of the regions corresponding to the bent end portions 41d on display.

In this liquid crystal display device, the tilt angle θa of one and the other linear portions 41a of each of the slits 41 of the common electrode 4 with respect to the aligning treatment directions 1a and 2a is preferably set to 80°±5°, more desirably 80°±2°, and the tilt angles θb and θc of the bent portions 41b and bent end portions 41d with respect to the aligning treatment directions 1a and 2a are preferably set to 60°±5°, more desirably 60°±2°. This can further improve the stability of the alignment of the liquid crystal molecules 3a when the lateral electric field E is applied.

In this liquid crystal display device, the liquid crystal layer 3 comprises a nematic liquid crystal having a negative dielectric anisotropy (which will be referred to as a liquid crystal whose $\Delta\epsilon$ is negative hereinafter). For this reason, when the lateral electric field E is generated between the edges of the slits 41 of the common electrode 4, each having the above shape, and the pixel electrode 5, the liquid crystal molecules 3a are oriented such that the direction of the molecular long axes changes along the edges of the slits 41 of the common electrode 4, as shown in FIG. 6.

For this reason, even when the strong lateral electric field E that orients the molecular long axes of the liquid crystal molecules 3a in directions at an angle of almost 45° or an angle close to it relative to the aligning treatment directions 1a and 2a is generated between the edges of the slits 41 of the common electrode 4 and the pixel electrode 5, the direction of the lateral electric field E is a direction almost perpendicular to the molecular long axes of the liquid crystal molecules 3a. The lateral electric field E therefore acts as a force that aligns the liquid crystal molecules 3a parallel to the surfaces of the substrates 1 and 2 instead of a force that raises the liquid crystal molecules 3a upright relative to the surfaces of the substrates 1 and 2.

That is, this liquid crystal display device uses a liquid crystal whose $\Delta\epsilon$ is negative, and hence the occurrence of disclination along the edges of electrodes due to a lateral electric field is suppressed unlike in a conventional lateral electric field control liquid crystal display device using a liquid crystal whose $\Delta\epsilon$ is positive.

In this liquid crystal display device as well, when the observation surface is pressed with a finger or the like while the lateral electric field E is generated, disclination occurs due to the surface pressing. This is because the portion of the observation-side substrate 1 on which the surface pressing force is applied deforms so as to tilt in the inner surface direction from the periphery of the portion toward the center, and the liquid crystal molecules 3a are oriented so as to rise upright along the tilt direction of the substrate 1. This oriented state in which the liquid crystal molecules 3a rise upright is observed as disclination.

In the liquid crystal display device of this embodiment, alignment irregularity due to the above surface pressing occurs. However, disclination due to the above surface pressing can be eliminated in a short period of time because the slits 41 of the common electrode 4 each are formed into the continuous shape (to be referred to as a hanger shape hereinafter) constituted by one and the other linear portions 41*a* which extend from the middle portion in the lengthwise direction of the slit toward one end and the other end in directions tilting to one side relative to the directions perpendicular to the aligning treatment directions 1*a* and 2*a* and crossing the aligning treatment directions 1*a* and 2*a* at the predetermined angle θa, the bent portions 41*b* which are formed at the adjacent ends of one and the other linear portions 41*a* and extend in the directions crossing the aligning treatment directions 1*a* and 2*a* at the angle θb smaller than the crossing angle θa of the linear portions 41*a* with respect to the aligning treatment directions 1*a* and 2*a*, the joint portion 41*c* between the bent portions 41*b*, and the bent end portions 41*d* which are respectively formed at the ends, of one and the other linear portions 41*a*, which are located on the opposite side to their adjacent ends, so as to extend in the directions crossing the aligning treatment directions 1*a* and 2*a* at the angle θc smaller than the crossing angle θa of the linear portions 41*a* with respect to the aligning treatment directions 1*a* and 2*a*.

That is, in this liquid crystal display device, from the viewpoint of the entire pixel 100, the liquid crystal molecules 3*a* are moved by the lateral electric field E generated between the edges of one and the other linear portions 41*a* of each of the hanger-shaped slits 41 of the common electrode 4 and the pixel electrode 5, and are oriented such that the molecular long axes are rotated though an angle corresponding to the strength of the lateral electric field E.

The middle portion of each of the hanger-shaped slits 41 of the common electrode 4 in the lengthwise direction and the two end portions of the slit, i.e., the two end sides of one and the other linear portions 41*a*, are bent at the angle θc smaller than the crossing angle θa of the linear portions 41*a* with respect to the aligning treatment directions 1*a* and 2*a*. For this reason, when the oriented state of the liquid crystal molecules 3*a* is viewed in detail, at the two end sides of the linear portions 41*a*, the angle defined by the molecular long axes and the aligning treatment directions 1*a* and 2*a* is small even in a state in which the lateral electric field E is generated.

In this state in which the lateral electric field is generated, therefore, even if alignment irregularity occurs as the liquid crystal molecules 3*a* in the corresponding portion rise upright as described above due to the above surface pressing, the liquid crystal molecules 3*a* near the bent portions at the middle and two ends of each of the hanger-shaped slits 41 of the common electrode 4 receive the strong anchoring force due to the above aligning treatments. For this reason, when the surface pressing force is released, the liquid crystal molecules 3*a* near the bend portions of the slit 41 are restored to the initial alignment state which is almost parallel to the surfaces of the substrates 1 and 2, and the neighboring liquid crystal molecules 3*a* are also attracted by intermolecular force to be restored to the initial alignment state.

As described above, in the above liquid crystal display device, alignment Irregularity temporarily occurs due to surface pressing. However, when the surface pressing force is released, the alignment state of the liquid crystal molecules 3*a* is restored to the initial alignment state, which is almost parallel to the surfaces of the substrates 1 and 2, with the liquid crystal molecules 3*a* near the bent portions at the middle and two ends of each of the hanger-shaped slits 41 of the common electrode 4 serving as starting points. This can suppress the occurrence of disclination due to the surface pressing and provide display without any display irregularity.

In addition, in this liquid crystal display device, the pixel electrodes 5 provided on the inner surface of the rear substrate 2 are covered with the insulating film 15, and the common electrode 4 provided with the slits 41 is placed on the insulating film 15, i.e., on the inner surface side relative to the pixel electrodes 5. With this structure, the surface of the aligning film 19, which is formed on the inner surface of the rear substrate 2 so as to cover the common electrode 4, has high evenness. This provides high alignment stability. Therefore, when the surface pressing force is released, since strong anchoring force acts on the liquid crystal molecules 3*a* to restore them to the initial alignment state almost parallel to the surfaces of the substrates 1 and 2, the alignment irregularity due to the above surface pressing is quickly eliminated, thereby suppressing the occurrence of disclination.

Furthermore, in this liquid crystal display device, since the common electrode 4 is formed to cover the scanning lines 13 and the signal lines 14 extending along the pixels 100, no strong electric field irrelevant to display is generated between the common electrode 4 and the scanning lines 13 and the signal lines 14. This can stabilize the alignment of the liquid crystal molecules 3*a* in regions other than the pixels 100 and further suppress the occurrence of disclination due to the above surface pressing.

Second Embodiment

Figure 8:
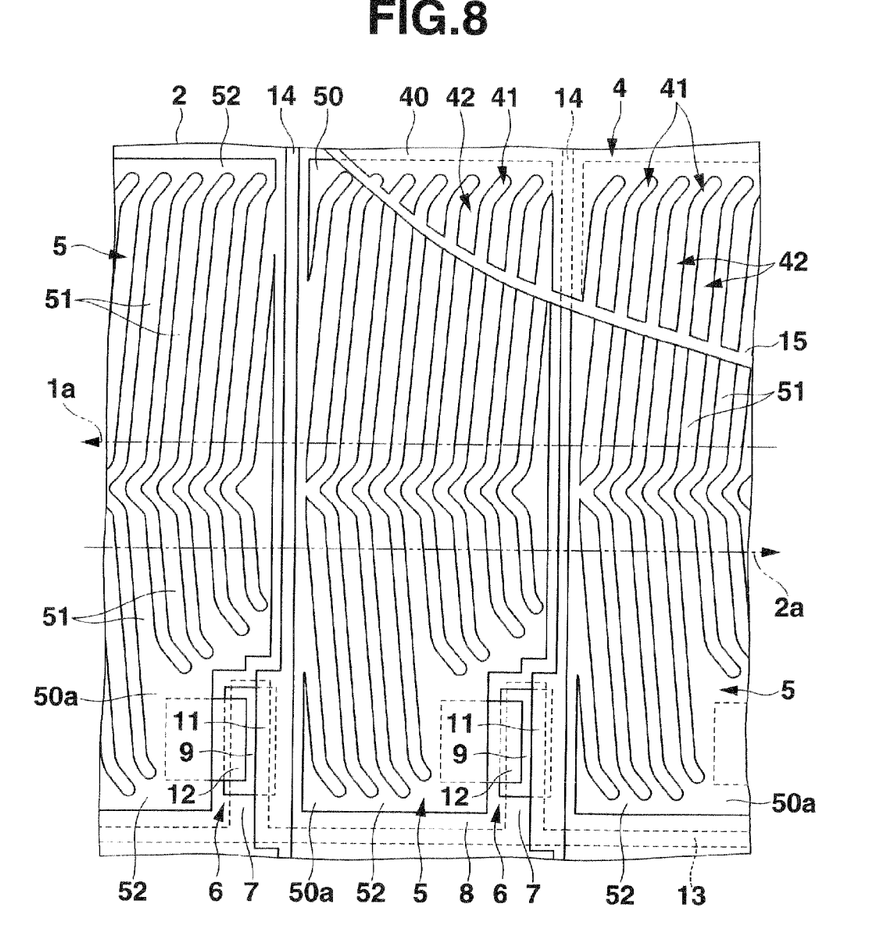
FIG. 8 is a plan view of part of one substrate of a liquid crystal display device according to the second embodiment.
Figure 9:
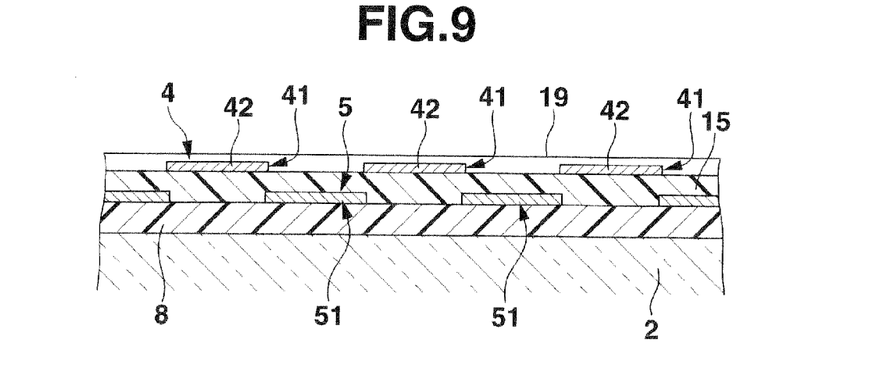
FIG. 9 is an enlarged sectional view of part of one pixel of the liquid crystal display device according to the second embodiment.

FIGS. 8 and 9 show the second embodiment of the present invention. FIG. 8 is a plan view of part of one substrate of a liquid crystal display device. FIG. 9 is an enlarged sectional view of part of one pixel of the liquid crystal display device. Note that the same reference numerals as in the first embodiment denote the same parts in the second embodiment in FIGS. 8 and 9, and a description will not be repeated.

In the liquid crystal display device of this embodiment, pixel electrodes 5 each are formed from a transparent conductive film (e.g., an ITO film) 50*a* which corresponds to a predetermined region for the formation of one pixel and is provided with commonly connected electrode portions 51 formed into a shape conforming to each of the slits 41 of the common electrode 4 described above. Other arrangements are the same as those of the liquid crystal display device of the first embodiment.

In the liquid crystal display device of this embodiment, the electrode portions 51 of the pixel electrode 5 are formed by providing the conductive film 50*a* with slits each having a shape almost identical to the shape of each of elongated electrode portions 42 formed from portions between the adjacent slits 41 of the common electrode 4. The two ends of each of the elongated electrode portions 42 are respectively connected to common connecting portions 52 formed on the two edges of the conductive film 50*a*.

According to the liquid crystal display device of this embodiment, since the area of a port-on of the pixel electrode 5 which overlaps the common electrode 4 decreases, the stray capacitance generated between the common electrode 4 and pixel electrode 5 decreases. This reduces the load imposed on the driver for driving the liquid crystal display device.

Other Embodiments

In the first and second embodiments, the bent end portions 41*d* are respectively formed at the ends, of one and the other linear portions 41*a* of each of the slits 41 of the common electrode 4, which are located on the opposite side to their adjacent ends. However, it suffices to form the bent end portion 41d at only one of the ends of one and the other linear portions 41a.

In the above embodiments, the common electrode 4 is placed on the entire region in which the pixel electrodes 5 are arranged in a matrix form. However, the common electrode 4 may be placed for each row or column of the pixel electrodes 5 so as to cover at least the scanning lines 13 or the signal lines 14, and the pixel electrodes of each row or each column may be commonly connected at one end side or the two end sides.

In addition, in the above embodiments, the common electrode 4 and the pixel electrodes 5 are provided on the inner surface of the rear substrate 2. However, the electrodes 4 and 5 may be provided on the inner surface of the observation-side substrate 1.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display device comprising:
   a first substrate and a second substrate which have opposed surfaces respectively provided with aligning films and have undergone aligning treatments such that aligning treatment directions are parallel and opposite between the aligning films; and
   a liquid crystal layer which comprises a liquid crystal having a negative dielectric anisotropy and is placed between the first substrate and the second substrate such that molecular long axes of the liquid crystal are oriented substantially parallel to surfaces of the substrates,
   the first substrate including:
      a first conductive layer on which elongated electrode portions obliquely crossing the aligning treatment direction are formed parallel to each other so as to form slit portions between the adjacent electrode portions, and
      a second conductive layer which is formed on a layer different from the first conductive layer through an insulating layer so as to overlap the slit portions and overlap at least part of the first conductive layer,
      wherein the elongated electrode portions each include a first linear portion and a second linear portion which extend in different directions at angles line-symmetrical with respect to the aligning treatment direction, and
      wherein an angle of one of the first linear portion and the second linear portion with respect to the aligning treatment direction is set to an angle of smaller than 90° and larger than 70°.

2. The device according to claim 1, wherein the first conductive layer is formed between the second conductive layer and the aligning film on the first substrate.

3. The device according to claim 1, wherein the electrode portion further includes a third linear portion and a fourth linear portion which extend in different directions at angles line-symmetrical with respect to the aligning treatment direction, and the first linear portion, the third linear portion, the fourth linear portion, and the second linear portion are sequentially connected to each other in the order named.

4. The device according to claim 3, wherein an angle of one of the third linear portion and the fourth linear portion with respect to the aligning treatment direction is set to an angle of smaller than 70° and larger than 50°.

5. The device according to claim 4, wherein letting La be a length of one of the first linear portion and the second linear portion, and Lb be a length of one of the third linear portion and the fourth linear portion, the lengths are set to satisfy $$La > 3 \times Lb.$$

6. The device according to claim 4, wherein the electrode portion further includes a fifth linear portion and a sixth linear portion which extend in different directions at angles line-symmetrical with respect to the aligning treatment direction, and the fifth linear portion, the first linear portion, the third linear portion, the fourth linear portion, the second linear portion, and the sixth linear portion are sequentially connected to each other in the order named.

7. The device according to claim 6, wherein an angle of one of the fifth linear portion and the sixth linear portion with respect to the aligning treatment direction is set to an angle of smaller than 70° and larger than 50°.

8. The device according to claim 7, wherein letting La be a length of one of the first linear portion and the second linear portion, and Lc be a length of one of the fifth linear portion and the sixth linear portion, the lengths are set to satisfy $$La > 3 \times Lc.$$

9. The device according to claim 1, wherein
   the first conductive layer is electrically connected among pixel regions, and
   the second conductive layer is isolated for each of the pixel regions, and the isolated conductive layers are respectively connected to different thin-film transistors.

10. The device according to claim 1, wherein an area of the second conductive layer is larger than that of the slit portions.

11. A liquid crystal display device comprising:
    a first substrate and a second substrate which have opposed surfaces respectively provided with aligning films and have undergone aligning treatments such that aligning treatment directions are parallel and opposite between the aligning films; and
    a liquid crystal layer which comprises a liquid crystal having a negative dielectric anisotropy and is placed between the first substrate and the second substrate such that molecular long axes of the liquid crystal are oriented substantially parallel to surfaces of the substrates,
    the first substrate including:
       a first conductive layer in which elongated slit portions obliquely crossing the aligning treatment direction are formed parallel to each other, and
       a second conductive layer which is formed on a layer different from the first conductive layer through an insulating layer so as to overlap the slit portions and overlap at least part of the first conductive layer,
       wherein the elongated slit portions each including a first linear portion and a second linear portion which extend in different directions at angles line-symmetrical with respect to the aligning treatment direction, and
       wherein an angle of one of the first linear portion and the second linear portion with respect to the aligning treatment direction is set to an angle of smaller than 90° and larger than 70°.

12. The device according to claim 11, wherein the first conductive layer is formed between the second conductive layer and the aligning film on the first substrate.

13. The device according to claim 11, wherein the slit portion further includes a third linear portion and a fourth linear portion which extend in different directions at angles line-symmetrical with respect to the aligning treatment direction, and the first linear portion, the third linear portion, the fourth linear portion, and the second linear portion sequentially communicate with each other in the order named.

14. The device according to claim 13, wherein an angle of one of the third linear portion and the fourth linear portion with respect to the aligning treatment direction is set to an angle of smaller than 70° and larger than 50°.

15. The device according to claim 14, wherein letting La be a length of one of the first linear portion and the second linear portion, and Lb be a length of one of the third linear portion and the fourth linear portion, the lengths are set to satisfy $$La > 3 \times Lb.$$

16. The device according to claim 14, wherein the slit portion further includes a fifth linear portion and a sixth linear portion which extend in different directions at angles line-symmetrical with respect to the aligning treatment direction, and the fifth linear portion, the first linear portion, the third linear portion, the fourth linear portion, the second linear portion, and the sixth linear portion are sequentially communicate with each other in the order named.

17. The device according to claim 16, wherein an angle of one of the fifth linear portion and the sixth linear portion with respect to the aligning treatment direction is set to an angle of smaller than 70° and larger than 50°.

18. The device according to claim 17, wherein letting La be a length of one of the first linear portion and the second linear portion, and Lc be a length of one of the fifth linear portion and the sixth linear portion, the lengths are set to satisfy $$La > 3 \times Lc.$$

19. The device according to claim 11, wherein
the first conductive layer is electrically connected among pixel regions, and
the second conductive layer is isolated for each of the pixel regions, and the isolated conductive layers are respectively connected to different thin-film transistors.

20. The device according to claim 11, wherein an area of the second conductive layer is larger than that of the slit portions.

* * * * *